UNITED STATES PATENT OFFICE.

ORAZIO LUGO, OF FLUSHING, ASSIGNOR TO JACOB WILLIAM DECASTRO, OF NEW YORK, N. Y.

IMPROVEMENT IN PURIFYING AND INCREASING THE ILLUMINATING POWER OF GAS.

Specification forming part of Letters Patent No. 214,412, dated April 15, 1879; application filed December 31, 1878.

*To all whom it may concern:*

Be it known that I, ORAZIO LUGO, of Flushing, Long Island, in the county of Queens and State of New York, have invented certain new and useful Improvements in Purifying and Increasing the Illuminating Power of Gas without appreciable loss in bulk; and I do hereby declare that the following is a full, clear, and exact description of the invention, which will enable others skilled in the art to which it appertains to make and use the same.

The usual mode of purifying illuminating-gas, whether manufactured by the destructive distillation of coal or by the decomposition of steam or water in contact with highly-heated carbon, and subsequently carbureted and fixed, is to condense the same, scrub it, and then pass it through lime, or subject it to the absorbent action of finely-divided ferric oxide, or, in order to get rid of the carbon dioxide as well, to the action of a mixture of equal parts of ferrous sulphate and sawdust with half the weight of slaked lime, whereby a mixture containing slaked lime, hydrated ferric oxide, and sulphate of lime, made porous with sawdust, is obtained.

Notwithstanding these processes, however, for the purification of gas, quantities of impurities, such as sulphur and its compounds, ammoniacal and other compounds, remain in the gas, greatly affecting the illuminating power of the gas, as well as proving injurious to health and destructive to property.

Gas has also been purified by passing it through animal charcoal; but when this is used alone, after a short time it loses its power of absorbing impurities, and has then to be washed with steam or water, or have atmospheric air blown through it, or it has to be revivified by heat. While used alone it also reduces the candle-power of the gas passed through it and greatly diminishes its bulk.

The object of my invention is thoroughly to purify illuminating-gas, to make the operation continuous, and to purify the gas without detracting from its illuminating power, and without causing any appreciable diminution in bulk; and to this end my invention consists, generally, in increasing the power of animal charcoal to eliminate those substances from illuminating-gas which are considered impurities, and particularly in passing the gas to be purified through the animal charcoal, together with atmospheric air, as well as in charging the char with a substance which will prevent it from depriving the gas of illuminants.

To carry my invention into effect, I moisten the char (which may be either new or spent) with coal-tar, or with coal-tar and water, or in some cases with water only, and then charge this mass into one or more vessels, which then constitute the purifiers. I may put the mass into the vessels while still wet or after it has dried. Through these vessels the gas is to pass; but before it is admitted I introduce into it at the retorts, or at the stand-pipe or mains beyond, in order to insure a thorough admixture, a small quantity of atmospheric air—say, from eight-tenths to two and a half per cent. of the bulk of the gas to be purified. The quantity of air will, however, depend upon the impurities of the gas. Any suitable mixing device for thoroughly mixing the admitted air with the gas may be located at any point in the mains between the retorts and the bone-black purifiers, or even at the point of admission in the purifier. For water-gas the char wet with water alone may suffice, air being introduced in the gas. The oxygen of the air partly unites with the sulphur to form soluble salts, and the rest combines totally with the hydrogen of the sulphureted and other hydrogen sulphur compounds to form water, and part of the sulphur of the sulphureted hydrogen and other sulphur compounds is precipitated in a free state in the char, while its nitrogen partly goes to form, with part of the remaining hydrogen, ammonia bases. No free oxygen passes off with the purified gas, while if any nitrogen goes over, the quantity is so small that it is not detrimental. By the application of air in this manner the process is rendered continuous, as the char is constantly kept active for a great length of time.

When the char finally becomes exhausted it may then either be sold at a profit for the valuable ammoniacal salts it contains, or it may be revivified or be washed and have the sulphur dissolved out of it by a suitable sulphur solvent for reuse.

By charging the bone-black with coal-tar, I prevent the black from taking out of the gas passing through any olefiant gas or other heavy hydrocarbons serving as illuminants.

I may treat the black, either before or after putting it into the vessels, as may be most convenient or suitable, with any substance correlative to the illuminants of the gas—that is, with any substance which will saturate the black in such a manner that it will not take up such illuminants. I have particularly described coal-tar, because that is most readily at hand; but its hydrocarbon distillates or the benzole series will answer.

In the case of coal-gas, the sulphureted hydrogen with which it is contaminated is not only taken up, as just described, but the illuminating power of the gas, which is somewhat reduced if passed through dry animal charcoal or bone-black, is not only not decreased when air is used and the animal charcoal or bone-black is wet with tar, but is actually improved, inasmuch as it gives a much whiter flame, of the same candle-power as the gas not passed through animal charcoal or bone-black at all.

By the old method, when purification was effected by the use of lime, the sulphureted hydrogen and carbonic acid were absorbed by the lime, and the result was, of course, a great loss in the original bulk of the gas. Now, by my process the sulphur and hydrogen are separated, the sulphur remaining in the char and the hydrogen passing through with the gas, while the carbonic acid passes through entire; and although it passes through unchanged, it is sufficiently carbureted not to detract from the illuminating power of the gas.

I thus have practically the same bulk of gas after purification as before this operation, and it will be at once appreciated that a great loss is prevented without detriment to the consumer.

A striking advantage of my process is, that it unites the scrubbing and purifying operations, for the gas may be passed directly from the condenser into my purifiers.

I may sometimes use common charcoal, wet, as described, and with the introduction of air.

To eliminate sulphureted hydrogen, I may also mix with the char a substance which will of itself decompose sulphureted hydrogen contained in gas, such as oxide of iron, tin, manganese ore, &c.

When the gas issues from my purifiers it is entirely free from ammoniacal and sulphur compounds, and is nearly inodorous. When the char is removed from the purifiers it is also inodorous, and is in no sense offensive and disgusting, like gas-lime.

Having fully described my invention, what I desire to claim and secure by Letters Patent is—

1. The process of purifying illuminating-gas by passing the same mixed with air through animal charcoal treated as described, all as set forth.

2. In the purification of illuminating-gas by animal charcoal, the process of preventing absorption of illuminants of the gas by charging the black with a suitable correlative to such illuminants, as described.

3. The composition to be used in the purification of gas, consisting of animal-black and coal-tar, as set forth.

ORAZIO LUGO.

Witnesses:
PAUL GANDOLFO,
J. W. DECASTRO.

---

Correction in Letters Patent No. 214,412.

It is hereby certified that in the Letters Patent herein contained it is erroneously recited that the inventor, Orazio Lugo, has "assigned his right, title, and interest in said improvement to Jacob William Decastro, of New York, New York," and the patent is erroneously granted to said Decastro, his heirs or assigns; whereas the patent should have recited that said Orazio Lugo had assigned *one-half* of his right, title, and interest in said improvement to said Decastro, and it should have issued jointly to said Lugo and Decastro, their heirs or assigns, to conform to the assignment dated March 28, 1879, and duly recorded in the U. S. Patent Office, March 28, 1879, Liber Y23, pp. 298 and 299.